US007302845B2

(12) United States Patent
Sood et al.

(10) Patent No.: US 7,302,845 B2
(45) Date of Patent: Dec. 4, 2007

(54) METHOD FOR MEASUREMENT OF GAS FLOW VELOCITY, METHOD FOR ENERGY CONVERSION USING GAS FLOW OVER SOLID MATERIAL, AND DEVICE THEREFOR

(75) Inventors: Ajay Kumar Sood, Karnataka State (IN); Shankar Ghosh, Karnataka State (IN)

(73) Assignee: M/S Indian Institute of Science, Bangalore (IN)

( * ) Notice: Subject to any disclaimer, the term of this patent is extended or adjusted under 35 U.S.C. 154(b) by 130 days.

(21) Appl. No.: 10/544,244

(22) PCT Filed: Aug. 26, 2003

(86) PCT No.: PCT/IN03/00281

§ 371 (c)(1),
(2), (4) Date: Aug. 2, 2005

(87) PCT Pub. No.: WO2004/020324

PCT Pub. Date: Aug. 19, 2004

(65) Prior Publication Data
US 2006/0191353 A1 Aug. 31, 2006

(30) Foreign Application Priority Data
Mar. 2, 2003 (IN) .......................... 86/MAS/2003

(51) Int. Cl.
*G01F 1/68* (2006.01)
(52) U.S. Cl. ................................... 73/204.26
(58) Field of Classification Search ..............
73/204.23–204.26; 204/424
See application file for complete search history.

(56) References Cited

U.S. PATENT DOCUMENTS

| 3,691,408 | A | | 9/1972 | Rosso |
| 4,373,386 | A | | 2/1983 | Schuddemat et al. |
| 4,680,963 | A | | 7/1987 | Inagaki et al. |
| 4,744,246 | A | | 5/1988 | Busta |
| 5,446,437 | A | | 8/1995 | Bantien et al. |
| 6,200,445 | B1 | * | 3/2001 | Yokota et al. ............... 204/424 |
| 6,335,572 | B1 | * | 1/2002 | Uno et al. ................... 290/1 R |
| 6,670,582 | B2 | * | 12/2003 | Rudent et al. .............. 219/209 |

OTHER PUBLICATIONS

Chung, J., et al., "Multi-walled carbon nanotube sensors," 2003, Piscataway, NJ, IEEE, USA, 2003, pp. 718-721, vol. 1, XP001181228; ISBN: 0-7803-7731-1.
Ghosh, S., et al., "Carbon nanotube flow sensors," 2003, *Science* (USA), Science , Feb. 14, 2003, American Assoc. Adv. Sci., USA, vol. 299, No. 5609, Jan. 16, 2003, pp. 1042-1044; XP002279249, ISSN: 0036-8075.
Kral, P., et al., "Nanotube electron drag in flowing fluids," *Phys. Rev. Lett.* (USA) Physical Review of Letters, Jan. 1, 2001, APS, USA, vol. 86, No. 1, pp. 131-134, XP002279250, ISSN: 0031-9007.

* cited by examiner

*Primary Examiner*—Jewel Thompson
(74) *Attorney, Agent, or Firm*—DeWitt Ross & Stevens S.C.; Charles S. Sara

(57) ABSTRACT

The present invention relates to a method for energy conversion by gas flow over solid materials and also to a method for measurement of velocity of a gas flow over solid material such as doped semiconductors, graphite, and the like as a function of the 5 electricity generated in the solid material due to the flow of the gas along the surface thereof using a combination of the Seebeck effect and Bernoulli's principle.

44 Claims, 5 Drawing Sheets

METHOD FOR MEASUREMENT OF GAS FLOW VELOCITY, METHOD FOR ENERGY CONVERSION USING GAS FLOW OVER SOLID MATERIAL, AND DEVICE THEREFOR

FIELD OF THE INVENTION

The present invention relates to a method for energy conversion by gas flow over solid materials. More particularly, the present invention relates to a method for the generation of voltage and current by gas flow over solid material such as doped semiconductors, graphite, and the like. In particular, the present invention also relates to a method for the conversion of energy by a gas flow over a solid material using a combination of the Seebeck effect and Bernoulli's principle. The present invention also relates to a method for the measurement of velocity of a gas along the flow thereof as a function of the electricity generated in the solid material due to the flow of the gas along the surface thereof.

BACKGROUND OF THE INVENTION

The measurement of gas velocity along the direction of flow is of significant importance in several applications. For example, an accurate determination of wind velocity over oceans or rivers along the direction of the flow is important in predicting tidal patterns, potential weather fluctuations, etc.

The measurement of wind velocity is also of importance in aeronautics such as in wind tunnels to determine the aerodynamics of aircraft designs. Another area where determination of wind velocity is of importance is in airports wherein an accurate determination of wind velocity will increase the safety factor in the landing and take off of airplanes. Another area where determination of wind velocity is of importance is in the field of disaster management. The accurate determination of wind velocity is useful for determining the potential for natural disasters like typhoons, tornadoes and avalanches.

The determination of gas flow velocity as a function of electricity generated due to flow of the gas along a solid material has the added benefit of energy conversion. Thus, the kinetic energy of the gas is converted into electrical energy. This phenomenon has tremendous importance in areas such as medical instrumentation, metrology, pollution detection, automobile industry, aircraft and microscopy.

Several methods are known in the art for the measurement of gas velocity along its flow. For example, one method of low speed flow field velocity determination comprises particle imaging velocimetry, which comprises suspending aerosol particles in the gas. A fast charge coupled device is provided across the planar cross section of the flow in order to image the colloidal particles. The small seed colloidal particles are illuminated using a laser light sheet. The charge coupled device camera electronically records the light scattered from the particles. Analysis of the image obtained enables determination of the particle separation, and thereby the velocity of the particles, which are assumed to follow the path of the flow.

However, this method has several disadvantages. The primary disadvantage is the underlying assumption that the movement of all the colloidal particles assume the direction of the flow. This is not necessarily true in the case of large sized particles or in the case of ver low velocities. Thus, the application of this method is limited to velocities of greater than 2 cm/s. It is thus, also important in this method, to ensure that the particle size is small enough to ensure that the particle follows the flow of the gas but at the same time is large enough to effectively scatter light. The equipment required (lasers, CCD cameras) is also large in size. Another disadvantage is that the method is dependant entirely on image analysis and thereby on the analysis algorithms. Since the particle imaging velocimetry method measures the velocity of the colloidal particles and there is no direct digital signal corresponding to the gas velocity; the flow velocity of pure gas cannot be measured. The method also is not appropriate for systems where optical access is absent. Another disadvantage is that the equipment required such as lasers and charge coupled devices are expensive.

Another method known in the prior art for gas velocity measurement is Doppler velocimetry which comprises measurement of the Doppler shift of scattered light from the gas. The method relies on the fluctuation in the intensity of scattered light received from a gas when passing through the intersection of two laser beams. The Doppler shift between the incident and the scattered light is equal to the frequency of the fluctuation of intensity which is therefore proportional to the component of gas velocity lying in the plane of the two laser beams and perpendicular to their bisector. However, this method also suffers from several disadvantages. The method is operable where the particle velocities are greater than 0.1 cm/sec. This method also requires large and expensive equipment such as a plurality of lasers and digital counters. Another significant disadvantage of this method is that it is restricted to a single point measurement. Similar to particle imaging velocimetry, this method also requires that the particle size be small enough to flow along the gas flow path easily but large enough to produce the required signal above the noise threshold. This method also does not work in systems where optical access to the gas flow path at the measurement volume is absent. Signal level depends on the detector solid angle. As a result while the Mie scattering intensity is substantially better in the forward direction, it is difficult to set up forward receiving optics which remain aligned to the moving measurement volume. Greater noise at higher speed with radio frequency interference is possible. Again, similar to the PIV method, the flow velocity of unseeded gas cannot be measured since there is no direct digital signal corresponding to the gas velocity. This method is appropriate only for gas containing colloidal particles and not for clear gas.

U.S. Pat. Nos. 3,915,572 and 6,141,086 disclose a Laser Doppler velocimeter for measurement of velocity of objects or wind so as to determine the speed or relative speed of the object (such as for example an automobile) or in the case of wind measurement, the true air speed or wind gradients such as wind shear.

Another known method to measure fluid velocity comprises the measurement of heat transfer change using a electrically heated sensor such as a wire or a thin film maintained at a constant predetermined temperature using an electronic control circuit. The heat sensor is exposed to the fluid whose velocity measurement is to be taken. The fluid flowing past the sensor cools the heat sensor which is compensated by an increased current flow from the electronic control circuit. Thus, the flow velocity of the fluid can be measured as a function of the compensating current imparted to the heater by the electronic control circuit.

However, in this method a slight variation in the temperature, pressure or composition of the fluid under study can result in erroneous readings. In order to maintain a relatively accurate measurement from the heat sensor, it is also necessary to provide complicated compensating electronics for constantly calibrating the sensor against any change in environmental parameters. In addition, even such compensating electronics can be subject to error. The sensor generally is operable at fluid velocities of greater than 1 cm/second and not for very low velocities. At low velocities, the convention currents in the gas cause a malfunction in the sensor.

U.S. Pat. No. 6,470,471 discloses a gas flow sensor using a heated resistance wire commonly called a hot wire anemometer. U.S. Pat. No. 6,112,591 discloses a high response, heat transfer detection type flow sensor manufactured using micro-machining technology for IC production. This sensor has an improved efficiency of heat transfer from a heating element to heat receiving (sensing) element by controlling the direction of the gas flow between the elements or by using the characteristics of the fluid flow therein.

It is also known to calculate flow fluid velocity in high viscosity fluids using a plurality of pairs of piezo-resistive pressure sensors across an integrated fluid restriction in order to measure the differential pressure. However, this device measures the volumetric flow rates and not flow velocities. Also, this method is suitable only for measurement of small flow rates.

Yet another method for the measurement of flow velocities comprises the use of rotary flour meters which work on an arrangement of turbine wheels. The motion of the gas through the turbine, otherwise called the rotor wheel, causes the turbine to rotate. The rotational frequency of the rotor wheel depends on the velocity of the gas and is measured using either an electro-optical system or by electronically sensing the square wave pulse generated by magnets embedded in the turbine vanes. The size of the sensor arrangement is also to the order of 50 cm$^3$. The rotary flow meter is suitable for use in cooling systems irrespective of the nature of the gas (clear or seeded) and the sensor can determine if the gas is flowing in the forward or reverse direction.

As can be seen from the above discussion, the various methods known in the art for the measurement of flow velocities suffer from various disadvantages. Both particle imaging velocimetry and Doppler velocimetry require optical access and use lasers. As a result they are not suitable for example, in biological systems. The equipment size is also large rendering it expensive. Thermal anemometry requires large volumes of gases in order to minimize convection currents and generally is suitable only for large velocities. Thus it is not suitable for systems which involve small volumes of fluids flowing at low flow velocity. Rotary flow meters, pressure sensors and vortex flow sensors do not measure the flow velocities directly but rather the volumetric flow rates.

Another important area of investigation is the conversion of energy and energy conversion devices which are economical and possess a long life. Another area where energy conversion devices are required is for supply of electricity for domestic and industrial use. Currently, the demand for electrical energy worldwide is met by one of three sources: nuclear power, thermal power and hydroelectric power. Nuclear power plants require expensive safety equipment and measures in view of the potential for radiation leakage. Thermal power plants use fossil fuels, which result in the attendant problems of pollution and also suffer from reduced supplies due to depletion of fossil fuels and oil. Hydroelectric power requires large dams to be constructed and is completely dependant on water flow in a river or any other water source. The equipment required is also expensive and occupies a large area. Of the various devices and methods of flow velocity measurement, only one, namely rotary flow sensor can actually also generate electricity due to the action of the fluid flow across the turbine blades. However, the magnitude of the power generated in relation of the size of the device renders it unsuitable for use for large scale energy conversion.

It is also known in the art to generate electricity by wind power comprising windmills which utilize the flow of wind to generate electricity by the turning of turbines attached thereto. However, this method has the disadvantages of requiring a high degree of capital investment and space.

Ghosh et al, *Science,* 2999, 1042 (2003) and U.S. patent application Ser. No. 10/306,838 teach that the flow of liquids over single wall carbon nanotubes results in the generation of electricity in the flow direction and can be utilized for the measurement of liquid velocities. This disclosure also teaches that the induced voltage has a logarithmic dependence on flow velocity over the entire range of velocities $10^{-7}$ to $10^{-1}$ m/s. It is believed that this is due to the direct forcing of the free charge carriers in the nanotubes by the fluctuation of the Coulombic field of the liquid flowing past the nanotubes in terms of pulsating asymmetric ratchets. This results is a sub-linear dependence of induced voltage on the flow velocity. However, this phenomenon was specific to one-dimensional nature of the carriers in the nano-tubes and was absent in other solid material such as graphite or semi-conductors. Kral & Shapiro, *Phys. Rev. left.,* 86, 131 (2001) teach the generation of electric current and voltage by the transfer of momentum from flowing liquid molecules to the acoustic phonons in a nanotube as the phonon quasi-momentum, which in turn drags free charge carriers in the nanotube. This results in a linear relation between the induced current/voltage and the flow velocity.

In view of the large abundance of wind and other gases, it is desirable to develop a method and a device whereby the flow of gases can be utilized to convert energy irrespective of the scale of energy required as well as measurement of flow velocities of a low range irrespective of the nature of the gas.

OBJECTS OF THE INVENTION

The main object of the invention is to provide a method for the determination of flow velocity of a gas along the direction of the flow as a function of the electricity generated due to the flow of the gas across a solid material.

It is yet another object of the invention to provide a method for the determination of flow velocity of all gases irrespective of their nature which does not require optical access, is operable even at low flow velocities, irrespective of flow volumes.

It is yet another object of the invention to provide a method for the determination of flow velocities which does not require any external seeding with colloidal particles of determinate size in the gas and is not susceptible to variations in external parameters at a particular flow plane or viscosity.

Another object of the invention is to provide a method for the generation of electricity without reliance on any nuclear, thermal or hydroelectric power source and based purely on the flow of a gas.

It is yet another object of the invention to provide a flow sensing device for measurement of flow velocities of gases which is operable even at very low flow velocities with accuracy in measurement and low response times.

It is a further object of the invention to provide a flow sensing device which by its simplicity and small size of construction is economical, does not result in any turbulence in the gas flow thereby ensuring accuracy in flow velocity measurement, and is impervious to variations in external parameters such as ambient temperature.

It is another object of the invention to provide a flow sensing device which is operable irrespective of the nature of the gas (whether clear or turbid, high or low viscosity) with accuracy in measurement and low response times.

A further object of the invention is to provide a flow sensor device that does not require any external source of power for its operation.

It is another object of the invention to provide a flow sensor device capable of use as an energy conversion device capable of generating electrical energy based on gas flow.

It is a further object of the invention to provide an energy conversion device which by its simplicity of construction is economical, does not result in any turbulence in the gas flow thereby ensuring accuracy in flow velocity measurement, and is impervious to variations in external parameters such as gas or ambient temperature.

A further object of the invention is to provide an energy conversion device that does not require any external source of power for its operation.

SUMMARY OF THE INVENTION

The above and other objects of the invention are realized by the method of the invention which comprises the use of solid material such as graphite, semiconductors, single wall or multi-wall carbon nanotube, and other solid material which is conductive in nature, as flow sensors. Both methods of the invention, namely, gas flow velocity measurement and energy conversion are based on the induction of current/voltage in the solid material due to the flow of a gas across their surface and along direction of the flow.

Accordingly, the present invention provides a method for the determination of gas flow velocities irrespective of the nature of the gas or the flow velocity thereof, which comprises positioning a flow sensing device in a gas flow, said flow sensing device comprising of at least one electrically conducting solid material positioned at an angle to the gas flow, at least one conducting element connecting said at least one conducting material to a electricity measurement means, the gas flow over said at least one solid material generating a flow of electricity along the direction of the gas flow due to the pressure gradient developed across the solid material, said electrical energy being transmitted by said conducting element to said electricity measurement means provided external to the gas flow, to measure the electricity generated as a function of the rate of flow of said flow.

In one embodiment of the invention, the solid material comprises a material with a high Seebeck coefficient.

In another embodiment of the invention, the solid material is selected from the group consisting of doped semiconductor, graphite, single wall type carbon nanotube, multi-wall type carbon nanotube, and metallic material with a high Seebeck coefficient.

In another embodiment of the invention, the doped semi-conducting material is selected from the group consisting of n-Germanium, p-Germanium, n-silicon and p-silicon.

In another embodiment of the invention, the metallic material is selected from polycrystalline copper, GaAs, Tellurium and Selenium.

In another embodiment of the invention, the gas is selected from the group consisting of nitrogen, argon, oxygen, carbon dioxide and air.

In another embodiment of the invention, the response time of the flow sensing device is less than 0.1 second.

In another embodiment of the invention, the induced voltage in the solid material due to the flow of the gas depends on a temperature difference across the solid material along the direction of inviscid flow.

In another embodiment of the invention, gas velocity is in range of 1 to 140 m/s.

In yet another embodiment of the invention, the gas flow across the solid material is at an angle in the range of 20° to 70°, preferably 45°.

The present invention also provides a flow sensing device useful for measurement of gas flow velocities irrespective of the flow velocity or the nature of the gas, said device comprising at least one gas flow sensing element and at least a conducting element connecting said solid material to a electricity measurement means.

In one embodiment of the invention, the gas flow sensing element comprises a solid material with good electrical conductivity and high Seebeck coefficient.

In another embodiment of the invention, the solid material is selected from the group consisting of doped semiconductor, graphite, single wall type carbon nanotube, multi-wall type carbon nanotube, and metallic material with high Seebeck coefficient.

In another embodiment of the invention, the doped semi-conducting material is selected from n-Germanium, p-Germanium, n-silicon and p-silicon.

In another embodiment of the invention, the metallic material is selected from polycrystalline copper, GaAs, Tellurium and Selenium.

In another embodiment of the invention, the gas is selected from the group consisting of nitrogen, argon, oxygen, carbon dioxide and air.

In a further embodiment of the invention, the electricity measurement means comprises a ammeter to measure the current generated across the opposite ends of said at least one or more solid material or a voltmeter to measure the potential difference across the two opposite ends of the said one or more solid material.

In another embodiment of the invention, the flow sensing device comprises of a plurality of doped semiconductors all connected in series or parallel with a single conducting element each being provided at the respective extreme ends of the said plurality of doped semiconductors.

In a further embodiment of the invention, the said plurality of doped semiconductors are connected in series so as to measure the potential difference generated across the ends of the said plurality of doped semiconductors.

In yet another embodiment of the invention, the said plurality of doped semiconductors are connected in parallel to each other so as to enable determination of the current generated across the two ohmic contacts formed by the respective conducting elements at the ends thereof.

In another embodiment of the invention, the gas flow sensor comprises of a matrix consisting of a plurality of gas flow sensing elements consisting of solid materials connected by metal wires, the entire matrix being provided on a high resistance undoped semiconducting base, said semi-conducting base being connected to a electricity measurement means.

In a further embodiment of the invention, the electricity measurement means is selected from a voltmeter and an ammeter.

In another embodiment of the invention, the gas flow sensing elements forming the matrix and the metal wires connecting said gas flow sensing elements are provided on a single hip.

In another embodiment of the invention, the gas flow sensor comprises of alternate strips of n and p type semiconductors, each n and p type semiconductor strip being separated from its immediate neighbor by an thin intervening layer of undoped semiconductor, said alternate strips of n and p type semiconductors being connected by a conducting strip, said alternate strips of n and p type semiconductors with intervening undoped semiconductor layers, and conducting strip being provided on a semiconducting base material, electrical contacts being provided at two opposite ends of the base material and connected to a electricity measurement means.

In another embodiment of the invention, the flow sensing device comprises of a plurality of carbon nanotubes all connected in series or parallel with one conducting element each being provided at respective extreme ends of plurality of carbon nanotubes.

In a further embodiment of the invention, the said plurality of carbon nanotubes are connected in series so as to measure the potential difference generated across the ends of the said plurality of carbon nanotubes.

In yet another embodiment of the invention, the said plurality of nanotubes are connected in parallel to each other so as to enable determination of the current generated across the two ohmic contacts formed by respective conducting elements at ends thereof.

In yet another embodiment of the invention, the flow sensing device is provided on a insulated base.

In one embodiment of the invention, the conducting element comprises of a wire.

In a further embodiment of the invention, the conducting element comprises an electrode.

In yet another embodiment of the invention, the conducting element comprises of a combination of a wire connected to an electrode.

The invention also relates to method for the generation of electrical energy using an energy conversion device comprising at least one energy conversion means, at least a conducting element connecting said energy conversion means to a electricity storage or usage means, the flow of a gas across the energy conversion means resulting in is generation of a Seebeck voltage being generated in each energy conversion means along the direction of the gas-flow, thereby generating electrical energy, said electrical energy being transmitted to the energy storage or usage means through the conducting elements.

In one embodiment of the invention, the energy conversion means comprises a solid material with good electrical conductivity and high Seebeck coefficient.

In another embodiment of the invention, the solid material is selected from the group consisting of doped semiconductor, graphite, a single wall type carbon nanotube, a multi-wall type carbon nanotube, and metallic material with a high Seebeck coefficient.

In another embodiment of the invention, the doped semiconducting material is selected from group consisting of n-Germanium, p-Germanium, n-silicon and p-silicon.

In another embodiment of the invention, the metallic material is selected from polycrystalline copper, GaAs, Tellurium and Selenium.

In another embodiment of the invention, the gas is selected from the group consisting of nitrogen, argon, oxygen, carbon dioxide and air.

In another embodiment of the invention, the flow sensing device comprises of a plurality of doped semiconductors all connected in series or parallel with a single conducting element each being provided at the respective extreme ends of the said plurality of doped semiconductors.

In a further embodiment of the invention, the said plurality of doped semiconductors are connected in series.

In yet another embodiment of the invention, the said plurality of doped semiconductors are connected in parallel.

In another embodiment of the invention, the energy conversion device comprises of a matrix consisting of a plurality of gas flow sensing elements consisting of solid materials connected by metal wires, the entire mat being provided on a high resistance undoped semiconducting base, said semiconducting base being connected to a electricity storage or usage means.

In another embodiment of the invention, the gas flow sensing elements forming the matrix and the metal wires connecting said gas flow sensing elements are provided on a single chip.

In another embodiment of the invention, the energy conversion device comprises of alternate strips of n and p type semiconductors, each n and p type semiconductor strip being separated from its immediate neighbor by an thin intervening layer of undoped semiconductor, said alternate strips of n and p type semiconductors being connected by a conducting strip, said alternate strips of n and p type semiconductors with intervening undoped semiconductor layers, and conducting strip being provided on a semiconducting base material, electrical contacts being provided at two opposite ends of the base material and connected to a electricity storage or usage means.

In another embodiment of the invention, the energy conversion device comprises of a plurality of carbon nanotubes all connected in series or parallel with a single conducting element each being provided at the respective extreme ends of the said plurality of carbon nanotubes.

In a further embodiment of the invention, the said plurality of carbon nanotubes are connected in series.

In yet another embodiment of the invention, the said plurality of nanotubes are connected in parallel.

In yet another embodiment of the invention, the energy conversion device is provided on an insulated base.

In one embodiment of the invention, the conducting element comprises of a wire.

In a further embodiment of the invention, the conducting element comprises of an electrode.

In yet another embodiment of the invention, the conducting element comprises of a combination of a wire connected to an electrode.

In another embodiment of the invention, the energy storage means comprises of a battery or storage cell.

In another embodiment of the invention, the response time of the flow sensing device is less than 0.1 second.

In another embodiment of the invention, the induced voltage in the solid material due to the flow of the gas depends on a temperature difference across the solid material along the direction of inviscid flow.

In yet another embodiment of the invention, the gas velocity is in the range of 1 to 140 m/s.

In yet another embodiment of the invention, the gas flow across the solid material is at an angle in the range of 20° and 70°, preferably 45°.

The invention also relates to an energy conversion device comprising a energy generation means comprising one or more energy conversion means, each said one or more energy conversion means comprising of at least one solid material with a high Seebeck coefficient, at least one conducting element connecting said at least one energy conversion means to a electricity storage or usage means to store or use the electricity generated in the said one or more energy conversion means due to a gas flow across the energy conversion means.

In another embodiment of the invention, the solid material is selected from the group consisting of a doped semiconductor, graphite, a single wall type carbon nanotube, a multi-wall type carbon nanotube, and metallic material with a high Seebeck coefficient.

In another embodiment of the invention, the doped semiconducting material is selected from the group consisting of n-Germanium, p-Germanium, n-silicon and p-silicon.

In another embodiment of the invention, the metallic material is selected from polycrystalline copper, GaAs, Tellurium and Selenium.

In another embodiment of the invention, the gas is selected from the group consisting of nitrogen, argon, oxygen, carbon dioxide and air.

In a further embodiment of the invention, a electricity measurement means is provided connected to the one or more energy conversion means through said conducting element, comprising an ammeter to measure the current generated across the opposite ends of said at least one or more solid material or a voltmeter to measure the potential difference across the two opposite ends of the said one or more solid material.

In another embodiment of the invention, the energy conversion means comprises of a plurality of doped semiconductors all connected in series or parallel with a single conducting element each being provided at the respective extreme ends of the said plurality of doped semiconductors.

In a further embodiment of the invention, the said plurality of doped semiconductors are connected in series.

In yet another embodiment of the invention, the said plurality of doped semiconductors are connected in parallel.

In another embodiment of the invention, the energy conversion device comprises of a matrix consisting of a plurality of energy conversion means consisting of solid materials connected by metal wires, the entire matrix being provided on a high resistance undoped semiconducting base, said semiconducting base being connected to a electricity storage or usage means.

In another embodiment of the invention, the energy conversion means forming the matrix and the metal wires connecting said energy conversion means are provided on a single chip.

In another embodiment of the invention, the energy conversion means comprises of alternate strips of n and p type semiconductors, each n and p type semiconductor strip being separated from its immediate neighbor by an thin intervening layer of undoped semiconductor, said alternate strips of n and p type semiconductors being connected by a conducting strip, said alternate strips of n and p type semiconductors with intervening undoped semiconductor layers, and conducting strip being provided on a semiconducting base material, electrical contacts being provided at two opposite ends of the base material and connected to a electricity storage or usage means.

In another embodiment of the invention, the energy conversion means comprises of a plurality of carbon nanotubes all connected in series or parallel with a single conducting element each being provided at the respective extreme ends of the said plurality of carbon nanotubes.

In a further embodiment of the invention, the said plurality of carbon nanotubes are connected in series.

In yet another embodiment of the invention, the said plurality of nanotubes are connected in parallel.

In yet another embodiment of the invention, the energy conversion device is provided on an insulated base.

In one embodiment of the invention, the conducting element comprises of a wire.

In a further embodiment of the invention, the conducting element comprises of an electrode.

In yet another embodiment of the invention, the conducting element comprises of a combination of a wire connected to an electrode.

In another embodiment of the invention, the electricity storage means is a battery.

BRIEF DESCRIPTION OF THE ACCOMPANYING DRAWINGS

FIG. 1($b$) is a schematic representation of the flow sensing device of the invention wherein the conducting elements are clearly displayed and depicting an angle of 45° to the horizontal axis of the gas flow. Angles between 20° and 70° can also be used.

FIG. 1($c$) is a graph of the typical response of the response obtained by a device wherein the flow sensing element was an n doped Ge in a flow of argon gas at a flow velocity of 7 m/s.

FIG. 1($d$) is another schematic representation of the device of the invention wherein an experimental set up is provided to achieve a calibrated gas flow velocity (u) on the flow sensor.

Figure 2:
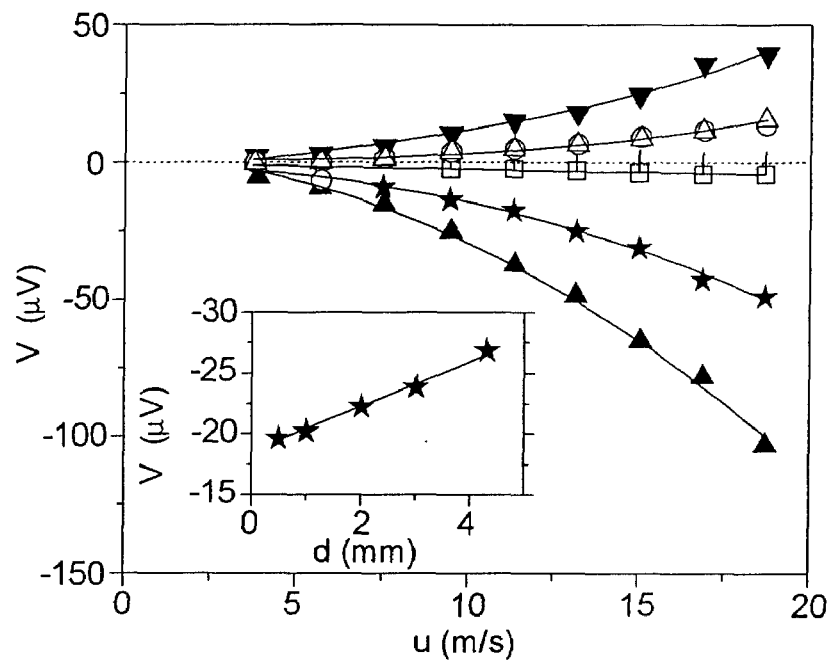
FIG. 2 is a graph showing the dependence of the signal V on the flow velocity of nitrogen for (bottom to top) n-Si (filled up triangles), n-Ge (stars), graphite (open squares), Pt metal (plus), SWNT (open circles), MWNT (open triangles) and p-Si (filled triangles).

The inset in FIG. 2 shows the dependence of V for n-Ge as a function of the active length d for a fixed value of velocity (u). The solid line is a fit to the equation $V=a_1+a_2\{(1+d/x_1)^{2/3}-1\}$ where $a_1$ and $a_2$ are fitting parameters and $x_1=0.5$ mm (from sample geometry)

Figure 3:
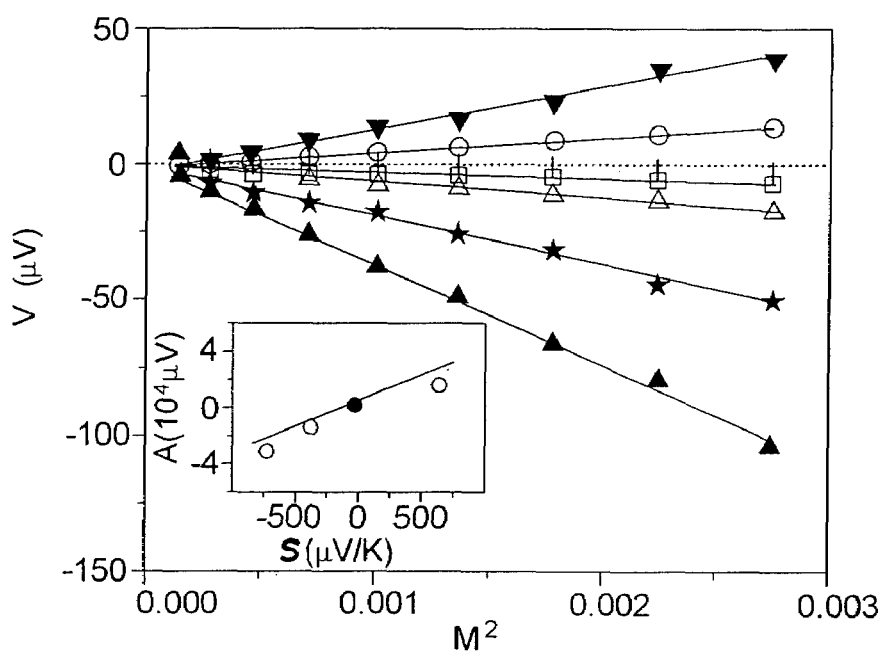

FIG. 3 is a plot of V versus square of the Mach number M (M=u/c, where c is the speed of sound in the gas) for the flow of nitrogen gas. The data and symbols are the same as in FIG. 2.

Figure 4:
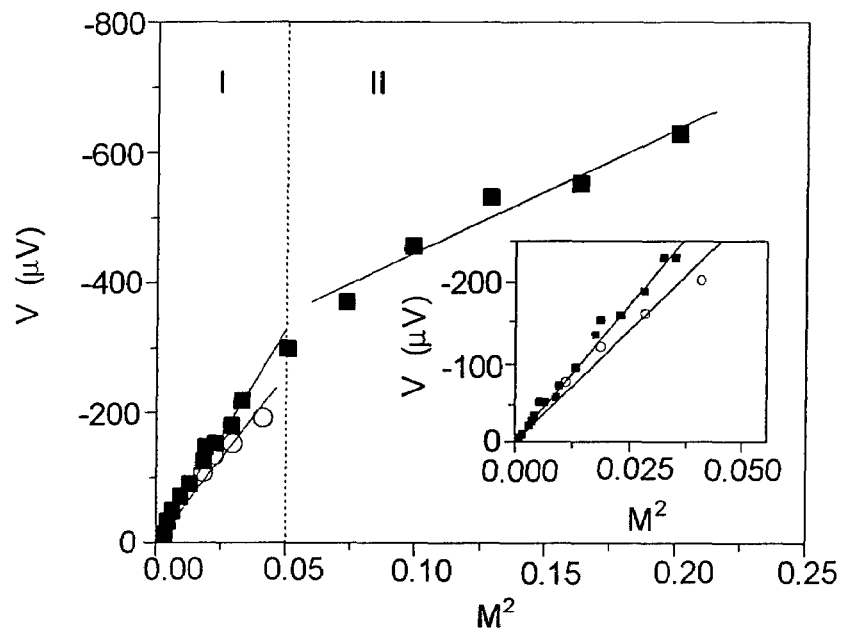

FIG. 4 is a graph of V versus $M^2$ for the flow of argon (filled squares) and nitrogen (open circles). The inset shows the expanded plot of regime I.

Figure 5:
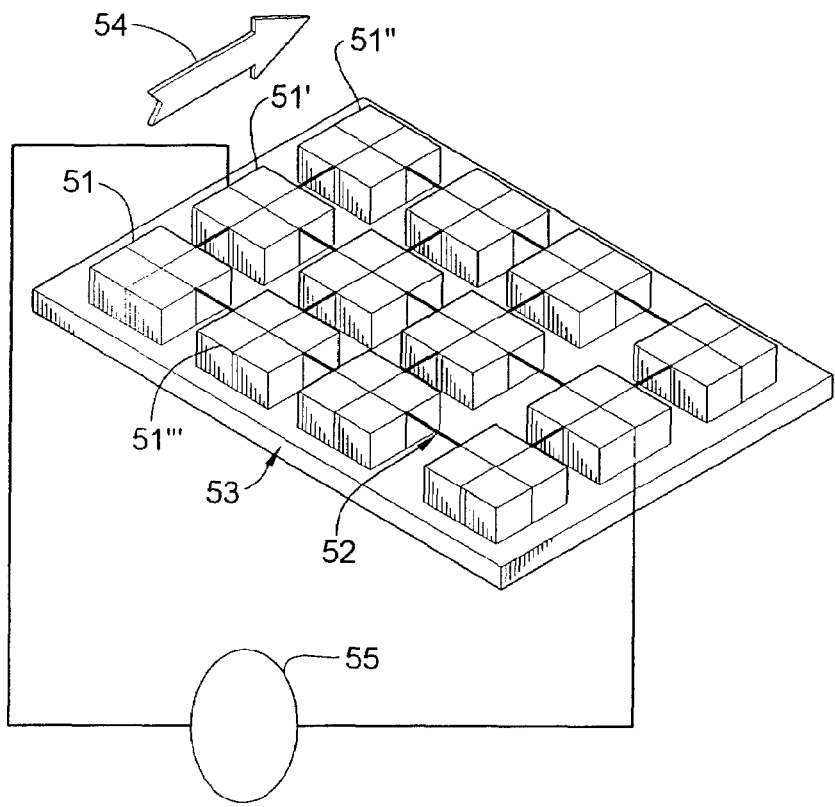

FIG. 5 is a schematic of the device according to one embodiment of the invention showing various gas flow sensor elements connected by means of metallic wires in a matrix formation and provided on a high resistance and undoped semiconductor substrate.

Figure 6:
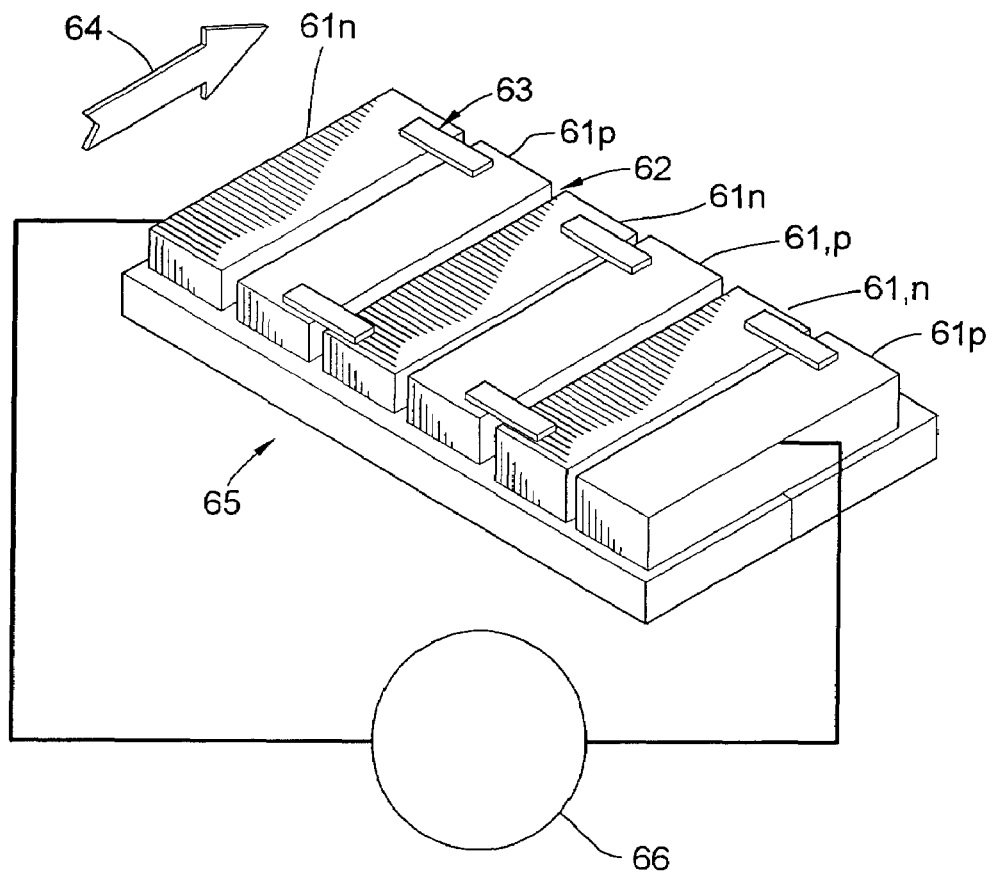

FIG. 6 is a schematic of another embodiment of the device of the invention showing alternate strips of n and p type semiconducting material with interposed layers of undoped semiconducting material, the alternating n and p type semiconducting material being connected by means of a conducting strip, the entire assembly being provided on a semiconducting base provided with two electrical contacts for connection to a electricity storage or electricity measurement means.

DETAILED DESCRIPTION OF THE INVENTION

As discussed above in the background to the invention, Ghosh et al, *Science*, 299, 1042 (2003) and U.S. patent application Ser. No. 10/306,838 teach that the flow of liquids along single wall carbon nanotubes results in the generation of electricity in the flow direction and can be utilized for the measurement of liquid velocities. This disclosure also teaches that the induced voltage has a logarithmic dependence on flow velocity over the entire range of velocities $10^{-7}$ to $10^{-1}$ m/s. It is believed that this is due to the direct forcing of the free charge carriers in the nanotubes by the fluctuation of the Coulombic field of the liquid flowing past the nanotubes in terms of pulsating asymmetric ratchets. This results in a sub-linear dependence of induced voltage on the flow velocity. However, this phenomenon was specific to one-dimensional structure of the carriers in the nano-tubes and was absent in other solid material such as graphite or semi-conductors.

It was also noted that while liquid flow resulted in generation of electricity in a single wall carbon nanotube when the carbon nanotube was placed in a flow of liquid at an angle of 0° to the flow, a similar result was not obtained in a flow of gas when the angle of the carbon nanotube to the flow was 0°. Thus, it was clear that Coulombic interactions as noted in liquid flow along a nanotube are not dominant in the case of flow of gas along a nanotube. However, it was observed that when the angle of the nanotube was changed from 0°, a voltage was induced along the ends of the voltmeter, though such voltage was weak. Further experiments using gas flow with other solid materials such as graphite, semiconductors, platinum and other metallic materials, multiwall carbon nanotubes, also provided the same results in some cases, i.e. no voltage when the solid material was at an angle of 0° and a voltage being generated when the solid material was at an angle of greater than 0° and 90° to the gas flow direction. It was surprising that to observe that a voltage and in some cases a good voltage was generated when solid materials were placed in a gas flow at an angle of greater than 0°. This clearly established that voltage generation was not a result of Coulombic interaction between the fluid flow and the free charges of the solid material as in the case of liquid flow. Further experimentation established that the voltage generation was a result of an interplay of the Bernoulli's principle and the Seebeck effect. Pressure differences along the gas streamline resulted in temperature differences across the solid material, which in turn produced the measured voltage. The electrical signal depended quadratically on the Mach number M where M=u/c where u was the gas velocity and c is the sound velocity in the gas. A direct generation of measurable voltages and currents was observed due to gas flow at even modest speeds over a variety of solids such as single and multi-walled carbon nanotubes, graphite, doped semiconductors, metallic material with a high Seebeck coefficient. For example, platinum where the Seebeck coefficient is close to 0, showed no voltage generation.

The present invention therefore provides a method and device for the generation of electricity due to the flow of different types of gases such as nitrogen, argon, oxygen air and the like over/across a variety of solid materials. The solid materials are substantially good conductors of electricity and can be selected from materials such as metallic materials, semiconductors, graphite, nanotubes and the like. The primary requirement is that such materials have a good Seebeck coefficient.

All embodiments of the present invention are based on the induction of electrical energy in a solid material due to the flow of a gas across the solid material thereby generating a Seebeck voltage in the solid material. This is irrespective of the velocity of the gas flow or the nature of the gas such as the purity or turbidity thereof, the volume of flow thereof at the measurement point, or any variations in external parameters such as pressure or density.

The present invention will now be described with reference to the accompanying drawings which are illustrative of the invention and should not be construed as being limitative thereof.

Figure 1A:
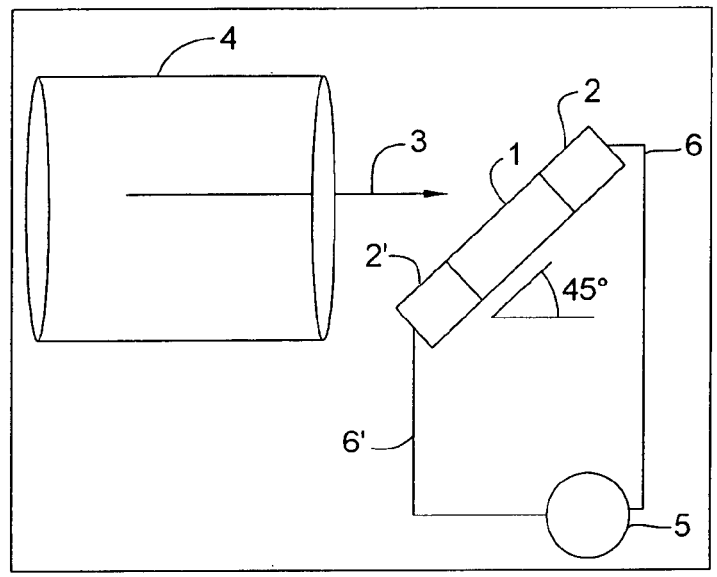
FIG. 1($a$) is a schematic representation of the flow sensing device used in the method of the invention.

FIG. 1(a) is a schematic representation of the device used for flow measurement of gas velocity according to the method of the invention. In the embodiment depicted, a single flow sensing element such as a n doped Ge semiconductor (1) is shown sandwiched between two metal electrodes (2,2') provided at each end thereof. The metal electrodes (2,2') form ohmic contacts for the semiconductor (1). The combination of the semiconductor (1) and the metal electrodes (2,2') provided thereon are supported on an insulating material base (not shown) made for example of undoped semiconducting material or of any insulating material such as polytetrafluoroethylene. The insulating base with the semiconductor (1) and electrodes (2,2') are immersed at an angle of 45° to the horizontal axis of the gas flow (3) whose velocity is to be measured. The gas flow is through a tube (4). The tube can be used to pass different gases at different velocities. The electrodes (2,2') are connected to an electricity measurement means (5) such as a voltmeter through lead wires (6,6'). The voltage measurement means (5) is provided external to the tube (4). The direction of the flow of the gas in FIG. 1(a) is depicted by the arrow through the tube (4) which continues over the flow sensing element (1).

Figure 1B:
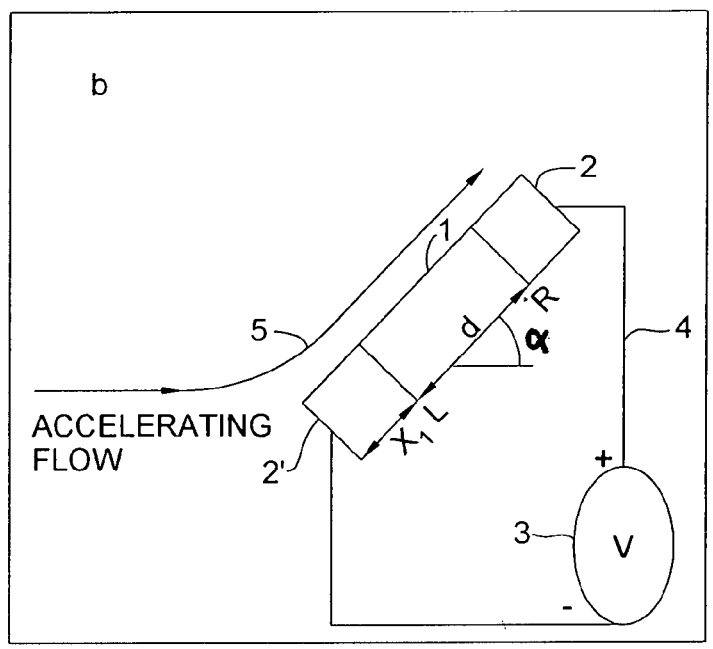

FIG. 1(b) is a schematic representation of the flow sensing device of the invention wherein the conducting elements are clearly displayed and depicting the angle of 45° to the horizontal axis of the gas flow. Other angles between 20° and 70° can also be used. In FIG. 1(b) the flow sensing element (1) is sandwiched between two electrodes (2,2' which are in turn connected to the respective terminals of a electricity measurement means (3) through leads (4). The direction of the accelerating flow of the gas is depicted by the continuous arrow. d represents the active portion of the device which is at an angle of 45° to the horizontal axis of the flow direction. The schematic of FIG. 1(b) was used in example 3 below, wherein the specific construction and results obtained will be explained.

Figure 1C:
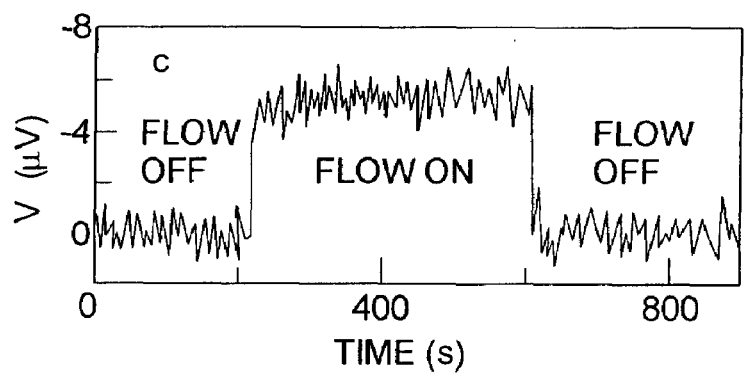

FIG. 1(c) is a graphical representation of the typical response obtained when the device of FIG. 1(b) is used wherein n doped Ge is the flow sensing element.

Figure 1D:
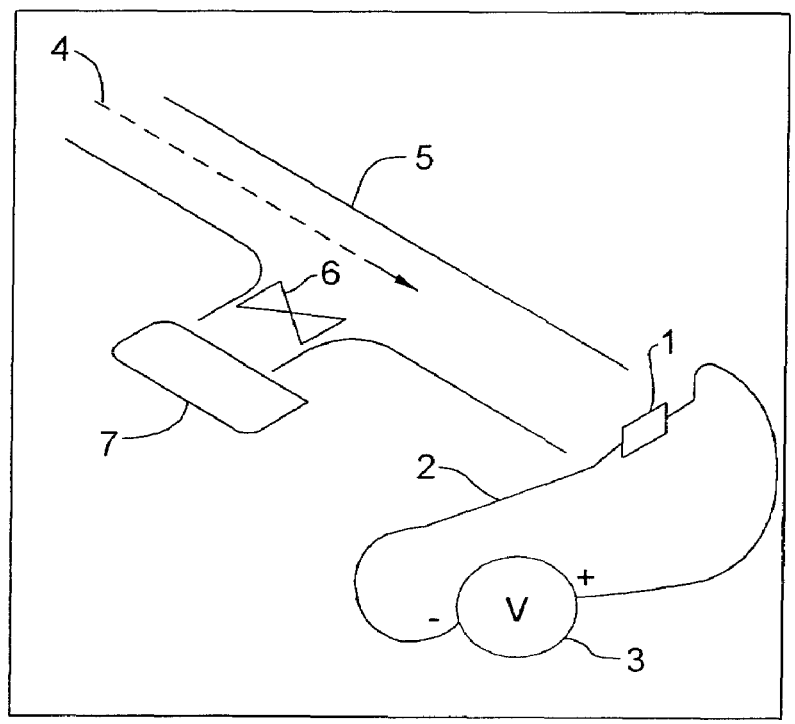

FIG. 1(d) is a schematic representation of one embodiment of the device of the invention used to achieve a calibrated gas flow velocity on the solid material of the device. The device of the invention comprises a flow sensing element (1) connected at either end thereof to two respective conducting elements (2), said conducting elements being connected in turn to the positive and negative terminals of a electricity measurement means such as a voltmeter (3). The flow sensing element (1) is kept at an angle of 45° to the horizontal axis of the gas flow from a gas source (4) such as a compressed gas cylinder through a tube (5). The flow rate at the exit point of the tube (5) is measured deduced from the measured flow rate at a side port (6) provided in the tube (5) using a rotameter (7).

The present invention shows for the first time that there is a direct generation of voltage due to the flow of gases such as argon, nitrogen and oxygen over solid material such as doped semiconducting material, graphite, single wall carbon nanotube, multiwall carbon nanotube and the like which have a high Seebeck coefficient. The gas velocities utilized were in the range of 1 to 140 m/s. The present invention also demonstrates that voltage and current depend quadratically on the flow velocity and the magnitude and sign of the voltage depends on the properties of the solid material. For example, argon at a flow velocity of 11 m/s generated a voltage of −16.4 µL for n-type Ge but a voltage of 5.9 µV for single wall carbon nanotube.

The phenomenon of voltage generation by the flow of gases is unrelated to a seemingly similar effect, viz, voltage generation by liquid over carbon nanotubes discussed in Ghosh et al, *Science*, 299, 1042 (2003)[1] and U.S. patent application Ser. No. 10/306,838. In these documents, the induced voltage had a logarithmic dependence on the flow velocity over the entire range of velocities $10^{-7}$ to $10^{-1}$ m/s. The voltage generation by the flow of liquids is very specific to the nature of the transport of charge carriers in one dimension, as manifested in SWNT and was absent in graphite. This is not so in the case of gas flow induced voltage in solids, where it depends on the generation of temperature difference across the solid along the direction of inviscid flow. This obviously is not applicable to the flow of liquids where the viscous drag dominates. On comparing the signals generated in SWNT by the flow of liquid (water) and gas (nitrogen), it was observed that the V~3 mV for $u=10^{-2}$ m/s (water) and V=15 µV for u=15 m/s (nitrogen gas).

The present invention also demonstrates that a sensor to measure the flow velocity of the gases can be made based on the generated electrical signal. The sensor of the invention is an active sensor which gives direct electrical response to the gas flow. This should be compared with the widely used gas flow sensor based on thermal anemometry, wherein, the fluid velocity is sensed by measuring changes in heat transfer from a small, electrically-heated sensor (wire or thin film) exposed to the fluid. Thermal anemometry works on heat balance equations and hence any small change in the temperature, pressure or composition of the gas can cause erroneous readings. Such effects are absent or are minimal in the case of the present invention and can, even if present, be taken into account in the sensors based on the direct generation of gas flow-induced voltage or current in the sensor material.

Though the present disclosure covers results for only for a few solids, the effect is not restricted to these materials alone. The guiding principle for the choice of the solid is its high Seebeck coefficient. Therefore, solids such as selenium (S~900 µ/K), tellurium (S~500 µV/K), GsAs and rare earth transition metal oxides are also useful. In the case of low doped semiconductors with $\rho \sim 10^6$ Ωcm, the voltage due to the gas flow is negligible, suggesting that the resistivity of the solid should not be very high. The magnitude of voltage and current can be easily scaled up by using a serial and parallel combination of sensing elements as depicted.

In FIG. 5 of the accompanying drawings, a number of gas flow sensing elements (51, 51', 51", . . . ) are interconnected in the form of a matrix using metal wires (52). The entire matrix is developed on a high resistance undoped semiconducting base (53). This formation is useful as a energy conversion device due to the flow of gases (54) there across. The electrical signals obtained are first harnessed and then measured using a voltmeter/ammeter (55). The sensing elements and the metal connecting wires can be fabricated on a single chip.

Following Allison et al, *Sensors and Actuators A*, 104, 32, 2003 and Rowe, *CRC Handbook of thermoelectrics*, Boca Raton, Fla., CRC Press, 1995, one embodiment is to take advantage of inverse Seebeck coefficients of n and p type Si or Ge. This embodiment is depicted in FIG. 6 wherein the n and p type semiconducting strips (61) are alternated. The n and p type semiconducting strips are made by ion implantation. Strips of undoped semiconducting material (62) are sandwiched between n and p type semiconducting strips (61). The n and p type semiconducting strips (61) are electrically bonded in series through a conducting material (63) to add the individual Seeback voltages when the sample is exposed to the gas flow (64). The entire assembly is provided on a semiconducting base (65) and is connected to a voltmeterammeter (66). The results obtained suggest that gas flow energy can be converted directly into the electrical signal without any moving pan, thus having a great potential for applications in generating electricity.

Another significant advantage of the flow sensor device of the invention is that it does not require any external power source for operation. On the contrary, the device of the invention generates electricity. The movement of the gas across the solid material results in the generation of a current I. The material along with the contacts have a resistance R, thereby enabling the formation of a voltage V across the sensor.

The invention will now be explained with reference to the following examples, which are exemplary and should not be construed as limiting the scope of the invention.

EXAMPLE 1

FIG. 1(*d*) shows a schematic layout of the experimental set up used in example 1 to achieve a calibrated gas flow velocity in the flow sensing device of the invention. Flow sensing devices comprising $3\times10^{-3}$ m along the gas flow and $1\times10^{-3}$ m perpendicular to the gas flow were used. The flow sensing elements were made of n-type Ge (Sb doped, ρ=0.01 Ωm), n-Si (ρ=0.01 Ωcm), p-Si (ρ=0.01 Ωcm), single wall carbon nanotubes, multi-wall carbon nanotubes, graphite and polycrystalline copper. The electrical contacts comprised of copper leads of $125\times10^{-6}$ m diameter made using silver emulsion (shown in the shaded region in FIG. 1(*b*)). The exposed area of the flow sensor element is not covered by the silver emulsion and was about $2\times10^{-3}$ m along the flow and $1\times10^{-3}$ m perpendicular to the flow of the gas. The sensing elements comprising single wall carbon nanotubes, multi-wall carbon nanotubes, and graphite were prepared by densely packing the powder between the two electrodes. The dimensions of the active solid material were about $1\times10^{-3}$ m along the flow, $2\times10^{-3}$ m wide and $2\times10^{-4}$ nm thick. FIG. 1(*c*) shows the voltage across a n-type Ge semiconducting based flow sensing element where the gas flow was at a velocity of u=7 m/s and is switched on and off.

The results of nitrogen flow over p-Si, n-Si, n-Ge, SWNT, MWNT and graphite are depicted in FIG. 2. The voltage V varies as $u^2$ over a wide range of u as does current, which is not shown therein. Though at low velocities as depicted in FIG. 2, the gas is not compressible, it can be scaled by thermal speed (which is sound velocity) to give a plot of V versus the square of the Mach number M as depicted in FIG. 3. M=u/c, where c is the sound velocity of the gas (=353 m/s for nitrogen and 323 m/s for argon at 300K). FIG. 2 shows the fit to $V=Du^2$ where D is a fit parameter as given in Table 1, and the solid lines in FIG. 3 are fit to V=AW², where A is the fit parameter which is also given in Table 1.

Gas from a compressed cylinder with a maximum pressure of 150 bars is let out at a given pressure into a tube of diameter 7×10³ m. The average velocity U at the end of the tube with cross sectional area (φ) is deduced from the measured flow rate Q by u=Q /φ. The flow sensor is kept at an angle of α=45° with respect to the horizontal axis. This resulted in the optimal signal. An angle of α=0° resulted in no effect since the pressure gradient was zero and an angle of α=90° also gave no result due to symmetry.

EXAMPLE 2

The same set up as in Example 1 was repeated except that the flow sensor element was kept at a distance of 2×10⁻² m from the exit point or 1×10⁻² m outside the tube. The results obtained were similar to those in Example 1.

EXAMPLE 3

The same experiment was repeated as in Example 1 except that the material in question was a solid polycrystalline copper sheet for which the slope of A was very small. The results are given in Table 1.

A comparison of the various results obtained show that the signal for p-type Si and SWNT are opposite to that for n-type Si, n-Ge, graphite and copper. SWNT samples are usually unintentionally p-doped (Hone et al, *Phys. Rev. Lett.*, 80, 1042, 1998 [4]; and Collins et al, *Science*, 287, 1801, 2000) [3]. This explains the sign of the flow induced voltage being the same for SWNT and p-Si. The inset of FIG. 3 shows the plot of the slope A versus the Seebeck coefficients (S) of the solid materials used. The coefficient A depends linearly on S as shown by the fitted line in the inset with slope=60K.

EXAMPLE 4

The method of the invention was tested using two separate gases, nitrogen and argon in order to measure the voltages V generated over large values of M² over n-Ge. The results are shown in FIG. 4. The inset in FIG. 4 clearly shows that the slope A for M²≦0.05 (hereinafter referred to regime I) is higher for argon (solid squares in FIG. 4) as compared to that for nitrogen (open circles in FIG. 4). The ratio of the slopes A(argon)/A(nitrogen)=1.2. It was established that there are two M² regimes by analysis of the mechanism behind the generation of electrical signal induced by the flow of gases over the solids.

For adiabatic steady inviscid flow of a gas, Bernoulli's equation gives the pressure difference along a streamline in terms of the Mach number M as $$\frac{P}{P_0} = \left[1 + \frac{1}{2}(\gamma-1)M^2\right]^{\frac{\gamma}{\gamma-1}}; \tag{1}$$

where $\gamma=C_p/C_v$; $C_p$ ($C_v$) is the specific heat at a constant pressure (volume). The values for argon and nitrogen are 1.667 and 1.404 respectively. In equation I, $P_o$ is the maximum pressure at a point on the streamline where the velocity is zero. Such a point is the leading edge on the surface of the flow sensor element past which the gas is flowing and is called the stagnation point. For the geometry shown in FIG. 1(b) the pressure difference between the two ends of the sample exposed to the gas flow (without the electrodes) is given below in Equation 2.

$$\frac{P_L - P_R}{P_0} = \frac{\gamma}{2}(M_R^2 - M_L^2). \tag{2}$$

Th subscripts L and R in equation 2 denote the left and right of the active part of the device when the gas flows from left to right. The fractional temperature difference ΔT/T is related to the pressure difference ΔP/P and the density difference Δρ/ρ as ΔT/T=ΔP/P−Δρ/ρ. When M<<1, the change in density of the gas is negligible i.e. the fluid is incompressible and therefore ΔT/T=ΔP/P. Therefore, the temperature difference along a streamline between two points separated by a distance d for the incompressible fluid flow for M<<1 (called regime I) is given by Equation 3 below $$\frac{\Delta T}{T_0} = \frac{\gamma}{2}(M_R^2 - M_L^2), \tag{3}$$

where $\Delta T=T_L-T_R>0$. The gas flowing past the flow sensing element is kept at an angle of α with respect to the horizontal axis corresponding to the accelerating flow and therefore $M_R>M_L$. The tangential component of the velocity of the outer flow u depends on the streamline distance x measured along the flat boundary as given in Equation 4 below.

$$u \propto \chi^{\alpha/(\pi-\alpha)}. \tag{4}$$

In the case of the device of the present invention, α=π/4 and therefore u α x^{1/3}. For non-rarefied gases, the boundary condition at the surface of the solid is that the temperatures of the gas and solid are equal. Thus, the temperature difference along the streamline in the gas flow will induce a temperature difference in the solid along the flow direction. The temperature difference in turn results in a voltage difference V defined $V_L-V_R$ due to the Seebeck effect depicted in equation 5 below:

$$V = \frac{k}{2}T_0 S\gamma(M_R^2 - M_L^2). \tag{5}$$

S is the Seebeck coefficient of the solid and is positive for p-type since majority and negative for n-type materials. Factor k depends on the specific interactions between the gas and the solid surface as well as the boundary conditions of the temperature difference between the solid and the gas.

Beyond a certain value of M, (~0.2), called regime II, the density of the gas needs to be catered for. This is provided by the following equation 6 given below:

$$\frac{\Delta T}{T} \simeq \frac{1}{2}(\gamma-1)(M_R^2 - M_L^2), \tag{6}$$

and hence $$V = \frac{kT_0}{2}(\gamma - 1)S(M_R^2 - M_L^2). \quad (7)$$

The above equations were verified by the experiments discussed in Examples 1 to 4. From equation 4, it evident that $M_L^2 \propto x_1^{2/3}$ and $M_R^2 \propto (x_1+d)^{2/3}$. Therefore, $M_R^2 - M_L^2 \propto M^2$, where M is the effective average Mach number. Equations 5 and 7, therefore, predict that in both regimes I and II, the induced voltage is proportional to $M^2$: $V=AM^2$. This is in agreement with the results shown in FIGS. 2 to 4. The slope A should depend linearly on S:$A=kT_0S\gamma/2$ in regime I (Eqn. 5). This is the case as shown by the plot of the observed values of A (solid circles) on the known values of S for different materials (Table 1) in the inset of FIG. 3. Using the fitted value of the slope (=60K) together with $\gamma=1.404$ and $T_o=300K$, k turns out to be 0.28. (iii) Equation 5 predicts that the ratio of the slopes, A, in regime I for flow of argon and nitrogen gases in $\gamma$(argon)/$\gamma$(nitrogen)=1.2, in agreement with the observed ratio (inset of FIG. 4). Equations 5 and 7 suggest that the ratio of slopes in the regions I and II of FIG. 4 should be $\gamma/(\gamma-1)$. This compares well with the observed value of 3.44 for argon (filled squares). The inset of FIG. 2 shows the dependence of measured V on the sample length d for n-Ge and flow velocity u=10 m/s. The data fit extremely well with the equation $V=a_1+a_2\{(1+d/x_1)^{2/3}-1\}$, where $a_1$ and $a_2$ are fitting parameters and $x_1=0.5$ mm (from the sample geometry).

The mechanism justifies the dependence on d: from Eqn. 4 for $a=45°$, $u^2 \propto d^{2/3}$. Therefore $V \propto [(x_1+d)^{2/3}-x]$. For $a=0°$ and $90°$, it was observed that the voltage is not generated by the gas flow and the signal changes sign for $a>90°$.

This observation is understandable from Eqn. 4 which predicts $u_L=u_R$ for $\alpha=0°$, orthogonal stagnation points for $\alpha=90°$, and decelerating flow for $\alpha<0°$. Another outcome of the proposed mechanism is that the voltage generated by the flow of gases on the platinum metal should be negligible because S~0 for platinum. This is indeed the case as shown by experiments (see plus signs in FIGS. 2 and 3).

TABLE I

Comparison of the slope A for materials with different Seebeck Coefficients with respect to Pt.

| Sample | D ($\mu Vs^2/m^2$) | A ($\mu V$) | S ($\mu V/K$) | Reference |
|---|---|---|---|---|
| n-Si | −0.28 | −35697 | −587 | 6, 5 |
| p-Si | 0.14 | 14539 | 574 | 6, 5 |
| n-Ge | −0.013 | −17576 | −300 | 6, 5 |
| SWNT | 0.04 | 5389 | 20 | 3 |
| MWNT | 0.04 | 5538 | 20 | 7 |
| graphite | −0.1134 | −1810 | −8 | 8 |
| copper | 0.0002 | 23 | 7.4 | 6, 5 |

REFERENCES

[1] S. Ghosh, A. K. Sood and N. Kumar, *Science* 299, 1042 (2003).
[2] P. Kral and Moshe Shapiro, *Phys. Rev. Let* 86, 131 (2001).
[3] P. G. Collins, K. Brandley, M. Ishigmi, A. Zettl, *Science* 287, 1801 (2000)
[4] J. Hone, I. Ellwood, M. Muno, A. Mizel, M. L. Cohen, and A. Zettl, *Phys. Rev. Lett.* 80, 1042 (1998).
[5] S. C. Allison, R. L. smith, D. W. Howard, C. Gonzalez, S. D. Collins, *Sensors and Actuators A,* 104, 32 (2003)
[6] D. M. Rowe, *CRC handbook of thermoelectrics,* Boca Raton, Fla.: CRC Press, 1995
[7] R. Seshadri, H. N. Aiyer, A. Govindraj and C. N. R. Rao, *Solid State Commun.* 91, 194 (1994).
[8] T. Takezawaetal, *Philos. Mag.* 19, 623(1969)

We claim:

1. A method for determining gas flow velocities comprising passing a gas over a solid material, the material kept at an inclined angle and having a high Seebeck coefficient, measuring the electric signal generated, and determining the gas flow velocity from the signal so generated.

2. A method as claimed in claim 1 wherein the solid material is selected from the group consisting of a doped semiconductor, a single wall type carbon nanotube, a multi-wall type carbon nanotube, graphite and metallic material with a high Seebeck coefficient.

3. A method as claimed in claim 2 wherein the doped semiconductor is selected from the group consisting of n-Germanium, p-Germanium, n-silicon and p-silicon.

4. A method as claimed in claim 2 wherein the metallic material is selected from polycrystalline copper, GaAs, $Bi_2Te_3$, Tellurium and Selenium.

5. A method as claimed in claim 1 wherein the gas is selected from the group consisting of nitrogen, argon, air, and carbon dioxide.

6. A method as claimed in claim 1 wherein the solid material is kept at an angle of 20° to 70° and particularly at an angle of 45°.

7. A flow sensing device for measuring gas flow velocities comprising at least one gas flow sensor made of metal having a high Seebeck coefficient and kept at an inclined angle, and at least one conducting element connecting the gas flow sensor to an electricity measurement means.

8. A flow sensing device as claimed in claim 7 wherein the metal is selected from the group consisting of a doped semiconductor, a single wall type carbon nanotube, a multi-wall type carbon nanotube, graphite and metallic material.

9. A flow sensing device as claimed in claim 8 wherein the doped semiconductor is selected from the group consisting of n-Germanium, p-Germanium, n-silicon and p-silicon.

10. A flow sensing device as claimed in claim 8 wherein the metallic material is selected from the group consisting of polycrystalline copper, GaAs, $Bi_2Te_3$, Tellurium and Selenium.

11. A flow sensing device as claimed in claim 7 wherein the flow velocity of a gas selected from the group consisting of nitrogen, argon, air, and carbon dioxide is measured.

12. A flow sensing device as claimed in claim 7 wherein the electricity measurement means is an ammeter or a volt-meter.

13. A flow sensing device as claimed in claim 7 wherein more than one gas flow sensor is provided.

14. A flow sensing device as claimed in claim 13 wherein the gas flow sensors comprise a plurality of doped semiconductors connected in series or parallel with a single conducting element at opposing ends of the sensors.

15. A flow sensing device as claimed in claim 14 wherein the semiconductors are connected in series.

16. A flow sensing device as claimed in claim 14 wherein the semiconductors are connected parallel to each other.

17. A flow sensing device as claimed in claim 7 wherein the gas flow sensor comprises a matrix consisting of a plurality of solid materials connected by metal wires, the matrix provided on a high resistance undoped semiconducting base and connected to an electricity measurement means.

18. A flow sensing device as claimed in claim 7 wherein the gas flow sensor comprises alternate strips of n- and p-type semiconductors, each n- and p-type semiconductor strip separated by an intervening layer of undoped semiconductor, the alternate strips of n- and p-type semiconductors connected by a conducting strip, wherein the alternate strips of n- and p-type semiconductors, intervening undoped semiconductor layers, and conducting strips are provided on a semiconducting base material with electrical contacts at opposing ends of the base material, where the base is connected to an electricity measurement means.

19. A flow sensing device as claimed in claim 14 wherein the gas flow sensors comprise a plurality of carbon nanotubes.

20. A flow sensing device as claimed in claim 18 wherein the semiconduting base material is insulated.

21. A flow sensing device as claimed in claim 7 wherein the conducting element comprises either a wire or an electrode.

22. A flow sensing device as claimed in claim 7 wherein the element comprises a wire and an electrode.

23. A method of generating electrical energy comprising passing a gas over a solid material kept at an inclined angle and having a high Seebeck coefficient, measuring the electric signal generated, and transmitting the electrical energy so generated.

24. A method as claimed in claim 23 wherein the solid material is selected from the group consisting of a doped semiconductor, a single wall type carbon nanotube, a multi-wall type carbon nanotube, graphite and metallic material with a high Seebeck coefficient.

25. A method as claimed in claim 24 wherein the doped semiconductor is selected from the group consisting of n-Germanium, p-Germanium, n-silicon and p-silicon.

26. A method as claimed in claim 24 wherein the metallic material is selected from the group consisting of polycrystalline copper, GaAs, $Bi_2Te_3$, Tellurium and Selenium.

27. A method as claimed in claim 23 wherein the gas is selected from the group consisting of nitrogen, argon, air and carbon dioxide.

28. A method as claimed in claim 23 wherein the solid material is kept at an angle of 20° to 70° and particularly at an angle of 45°.

29. A device for generating electrical energy comprising a gas flow sensor made of metal having a high Seebeck coefficient and kept at an inclined angle, at least one conducting element connecting the gas flow sensor to an electricity measurement means, and a means for transmitting the electrical energy generated.

30. A device for generating electrical energy as claimed in claim 29 wherein the metal is selected from the group consisting of a doped semiconductor, a single wall type carbon nanotube, a multi-wall type carbon nanotube, graphite and metallic material.

31. A device for generating electrical energy as claimed in claim 30 wherein the doped semiconductor is selected from the group consisting of n-Germanium, p-Germanium, n-silicon and p-silicon.

32. A device for generating electrical energy as claimed in claim 30 wherein the metallic material is selected from polycrystalline copper, GaAs, $Bi_2Te_3$, Tellurium and Selenium.

33. A device for generating electrical energy as claimed in claim 29 wherein a gas selected from the group consisting of nitrogen, argon, air and carbon dioxide contacts the gas flow sensor.

34. A device for generating electrical energy as claimed in claim 29 wherein the electricity measurement means is an ammeter or a volt-meter.

35. A device for generating electrical energy as claimed in claim 29 wherein more than one gas flow sensor is provided.

36. A device for generating electrical energy as claimed in claim 35 wherein the gas flow sensors comprise a plurality of doped semiconductors connected in series or parallel with a single conducting element at opposing ends of the sensors.

37. A device for generating electrical energy as claimed in claim 36 wherein the gas semiconductors are connected in series.

38. A device for generating electrical energy as claimed in claim 36 wherein the semiconductorrs are connected parallel to each other.

39. A device for generating electrical energy as claimed in claim 29 wherein the gas flow sensor comprises a matrix consisting of a plurality of solid materials connected by metal wires, the matrix provided on a high resistance undoped semiconducting base, the matrix connected to an electricity measurement means.

40. A device for generating electrical energy as claimed in claim 29 wherein the gas flow sensor comprises alternate strips of n- and p-type semiconductors, each n- and p-type semiconductor strip separated by an intervening layer of undoped semiconductor, the alternate strips of n- and p-type semiconductors connected by a conducting strip, wherein the strips of n- and p-type semiconductors, the intervening undoped semiconductor layers, and the conducting strip are provided on a semiconducting base material with electrical contacts at opposing ends of the base material, and the base is connected to an electricity measurement means.

41. A device for generating electrical energy as claimed in claim 36 wherein the gas flow sensors comprise a plurality of carbon nanotubes.

42. A device for generating electrical energy as claimed in claim 35 wherein the gas flows sensors are provided on an insulated base.

43. A device for generating electrical energy as claimed in claim 29 wherein the conducting element comprises either a wire or an electrode.

44. A device for generating electrical energy as claimed in claim 29 wherein the conducting element comprises a combination of a wire and an electrode.

* * * * *

UNITED STATES PATENT AND TRADEMARK OFFICE
CERTIFICATE OF CORRECTION

| | | |
|---|---|---|
| PATENT NO. | : 7,302,845 B2 | |
| APPLICATION NO. | : 10/544244 | |
| DATED | : December 4, 2007 | |
| INVENTOR(S) | : Ajay Kumar Sood and Shankar Ghosh | |

It is certified that error appears in the above-identified patent and that said Letters Patent is hereby corrected as shown below:

IN THE SPECIFICATION:
At column 1, line 66, delete "ver" and substitute therefor --very--.

At column 4, line 28, delete "left." and substitute therefor --Lett.--.

At column 7, line 45, after "in", delete "is".

At column 8, line 13, delete "mat" and substitute therefor --matrix--.

At column 10, line 24, delete "dearly" and substitute therefor --clearly--.

At column 13, line 12, before "for", delete the letter "L" and substitute therefor --V--.

At column 14, line 54, delete "nm" and substitute therefor --m--.

At column 14, line 62, delete "it" and substitute therefor --u--.

At column 15, line 1, delete "AW" and substitute therefor --AM--.

At column 15, line 5, delete "U" and substitute therefor --u--.

At column 15, line 43, delete "dearly" and substitute therefor --clearly--.

At column 15, line 44, delete the bottommost underscore beneath "<".

UNITED STATES PATENT AND TRADEMARK OFFICE
CERTIFICATE OF CORRECTION

PATENT NO. : 7,302,845 B2
APPLICATION NO. : 10/544244
DATED : December 4, 2007
INVENTOR(S) : Ajay Kumar Sood and Shankar Ghosh It is certified that error appears in the above-identified patent and that said Letters Patent is hereby corrected as shown below:

At column 17, line 62, delete "Let" and substitute therefor --Lett.--.

At column 19, line 21, after "the", add --conducting--.

Signed and Sealed this

Twenty-ninth Day of April, 2008

JON W. DUDAS
*Director of the United States Patent and Trademark Office*